United States Patent [19]

Regan

[11] E Patent Number: Re. 31,645

[45] Reissued Date of Patent: Aug. 14, 1984

[54] SAFETY APPARATUS FOR AUTOMATICALLY SEALING HYDRAULIC LINES WITHIN A SUB-SEA WELL CASING

[75] Inventor: A. Michael Regan, Huntington Beach, Calif.

[73] Assignee: Regan Offshore International, Inc., Torrance, Calif.

[21] Appl. No.: 163,231

[22] Filed: Jun. 25, 1980

Related U.S. Patent Documents

Reissue of:

[64] Patent No.: 4,109,712
Issued: Aug. 29, 1978
Appl. No.: 820,829
Filed: Aug. 1, 1977

[51] Int. Cl.[3] ..... E21B 34/14

[52] U.S. Cl. ..... 166/340; 166/87; 166/332; 251/149.7

[58] Field of Search ..... 166/340, 344, 86, 87, 166/88, 332

[56] References Cited

U.S. PATENT DOCUMENTS

| | | | |
|---|---|---|---|
| 3,360,048 | 12/1967 | Watkins | 166/87 |
| 3,777,813 | 12/1973 | Dendy et al. | 166/72 |
| 3,786,863 | 1/1974 | Tausch | 166/72 |
| 3,786,867 | 1/1974 | Tausch et al. | 166/321 |
| 3,856,082 | 12/1974 | Dinning | 166/332 |
| 3,990,508 | 11/1976 | Boyadjieff et al. | 166/72 |
| 3,990,511 | 11/1976 | Gazda | 166/332 |

FOREIGN PATENT DOCUMENTS 1386108 3/1975 United Kingdom .

*Primary Examiner*—James A. Leppink
*Attorney, Agent, or Firm*—Robert A. Felsman; M. Michael Carpenter

[57] ABSTRACT

An improved safety apparatus for automatically sealing hydraulic lines within a sub-sea well casing when said casing is disconnected from an associated well head connector and Christmas tree assembly, has mandrel means associated with a well head connector assembly and valve means generally coaxially aligned within and to the casing means for controlling fluid flow through associated hydraulic lines, the valve means being moved into a valve-opened position by the mandrel means as the well head connector assembly is landed on the well casing head. Bias means associated with the valve means are provided for urging the valve means into a valve-closed position to seal the hydraulic lines when the mandrel means is withdrawn from the valve means. Hydraulic fluid flow is through passages through the mandrel, the valve means and associated portions of the well head connector and casing head, respectively. Seal means are associated with the valve means to provide a fluid-tight seal between the mandrel means and the valve means and between valve means and the well casing head.

16 Claims, 6 Drawing Figures

SAFETY APPARATUS FOR AUTOMATICALLY SEALING HYDRAULIC LINES WITHIN A SUB-SEA WELL CASING

Matter enclosed in heavy brackets [ ] appears in the original patent but forms no part of this reissue specification; matter printed in italics indicates the additions made by reissue.

BACKGROUND OF THE INVENTION

The present invention relates in general to safety devices for maintaining down hole hydraulically operated apparatus, such as blow out preventers, in operational condition if the connection between the well and marine riser is disconnected or damaged. More specifically, the present invention relates to an improved safety apparatus for automatically sealing hydraulic lines within a sub-sea well head casing when the casing is disconnected from an associated well head connector and Christmas assembly to maintain hydraulic pressure operating the down hole apparatus, i.e. blow out preventer.

In oil well drilling and production operations in both land and sub-sea locations, oil, mud and hydraulic fluids are normally transmitted through tubing, through the tubing-casing annulus and through casing annuli formed between successive generally concentric casings and hydraulic lines. Most often, these fluids are transmitted under very high pressures. It has long been a problem to effectively control the flow of these high pressure fluids through the tubing, tubing-casing, casing-casing annuli and hydraulic lines. The principle solution in the past has been to seal both the tubing and casing strings by two separate sealing elements within a casing head to affect an annulus seal. An access port into the annulus was then provided through the head between the two sealing elements. Fluid flow into or out of the annulus thus sealed off was controlled by means of a valve external of a casing head at the axis port. This prior arrangement presented many problems where the casing head was not readily accessible, particularly in sub-sea oil well drilling and production operations where the casing head may be at the bottom of the sea perhaps hundreds of feet below the floating vessel or platform from which the drilling and production operations are being controlled.

To obviate the problems inherent in a system which utilizes a valve external of the casing head in sub-sea oil well drilling operations where the casing heads is not readily accessible, annulus valve apparatus has been developed which is operable internally within the annuli formed between tubing-casing and casing-casing which was operable between a valve-opened and a valve-closed condition by means of standard wire line tooling which is in common use in the industry. Exemplary of an internal annulus valve apparatus is the annulus valve disclosed in U.S. Pat. No. 3,360,048, Watkins.

The annulus valve of Watkins was very effective in sealing annuli during routine maintenance and production operations of a pre-planned nature. However, due to the requirement that wire line tooling be used to operate the annulus valve, in those instances where the casing string or casing head were severed or damaged there was no provision for automatically sealing the annuli or hydraulic lines to prevent pollution of the environment by escaping fluids from therewithin. This problem was aggravated in sub-sea operations by the movement of the drilling platform or drilling ship and the increased risk of separation at the casing head due to tidal movement.

Of primary importance in sub-sea operations is the control of the various blow-out preventive equipment at or below the casing head. A particularly effective method of operating the various blow-out equipment has utilized pressurized hydraulic control lines which operate the safety equipment between a closed and an opened position. In these cases, due to the very great risk of pollution should the blow-out prevention equipment not operate due to damage of the hydraulic control system, the use of wire line tools to operate a hydraulic line valve has been found to be unacceptable. The hydraulic control lines for sub-sea blow-out prevention equipment must be automatic.

It is, therefore, an object of the present invention to disclose and provide an apparatus for and a method of automatically sealing hydraulic lines within a sub-sea well casing when said casing is disconnected from an associated well head connector and Christmas tree assembly.

It is a further object of the present invention to disclose and provide a control apparatus for closing off the well in the event that an upper portion of the Christmas tree structure is inadvertently damaged or destroyed.

Generally stated, the improved safety apparatus of the present invention includes the provision of a valve means movably mounted in the well casing head in association with hydraulic fluid lines running to down hole apparatus such as blow out preventers. The valve means is moved to a line opening position by the landing of the well head connector assembly on the well head. Means are provided for biasing the valve means to a line closing position so that on removal of the well head connector assembly from the casing head, the valve means closes the sub-sea hydraulic lines with respect to the sea environment at the well head and maintains line pressure required to keep down hole apparatus, i.e. blow out preventers operational.

More specifically the improved safety apparatus of the present invention has mandrel means associated with the well head connector assembly for operating the valve means to valve open position. The valve means is generally coaxially aligned within the casing head for receiving the mandrel means for controlling hydraulic fluid flow through passages in the mandrel, valve means and associated hydraulic lines. The valve means is urged into a valve-opened position automatically by the mandrel means as the well head connector assembly is secured to the well casing head. Bias means associated with the valve means urges the valve into a valve-closed position to seal the hydraulic lines automatically when the mandrel means is withdrawn from the well head. Seal means are associated with the valve means and the mandrel means to provide a fluid-type seal between the mandrel means and the valve means, between the valve means and the well casing head and between the mandrel means and the well head connector assembly.

Additional objects and advantages of the apparatus and method in accordance with the present invention will become readily apparent to those skilled in the art from a consideration of the following detailed description of an exemplary embodiment of the apparatus and method of the present invention. Reference will be made to the appended sheets of drawings which will first be discussed briefly.

DETAILED DESCRIPTION OF AN EXEMPLARY EMBODIMENT

Figure 1:
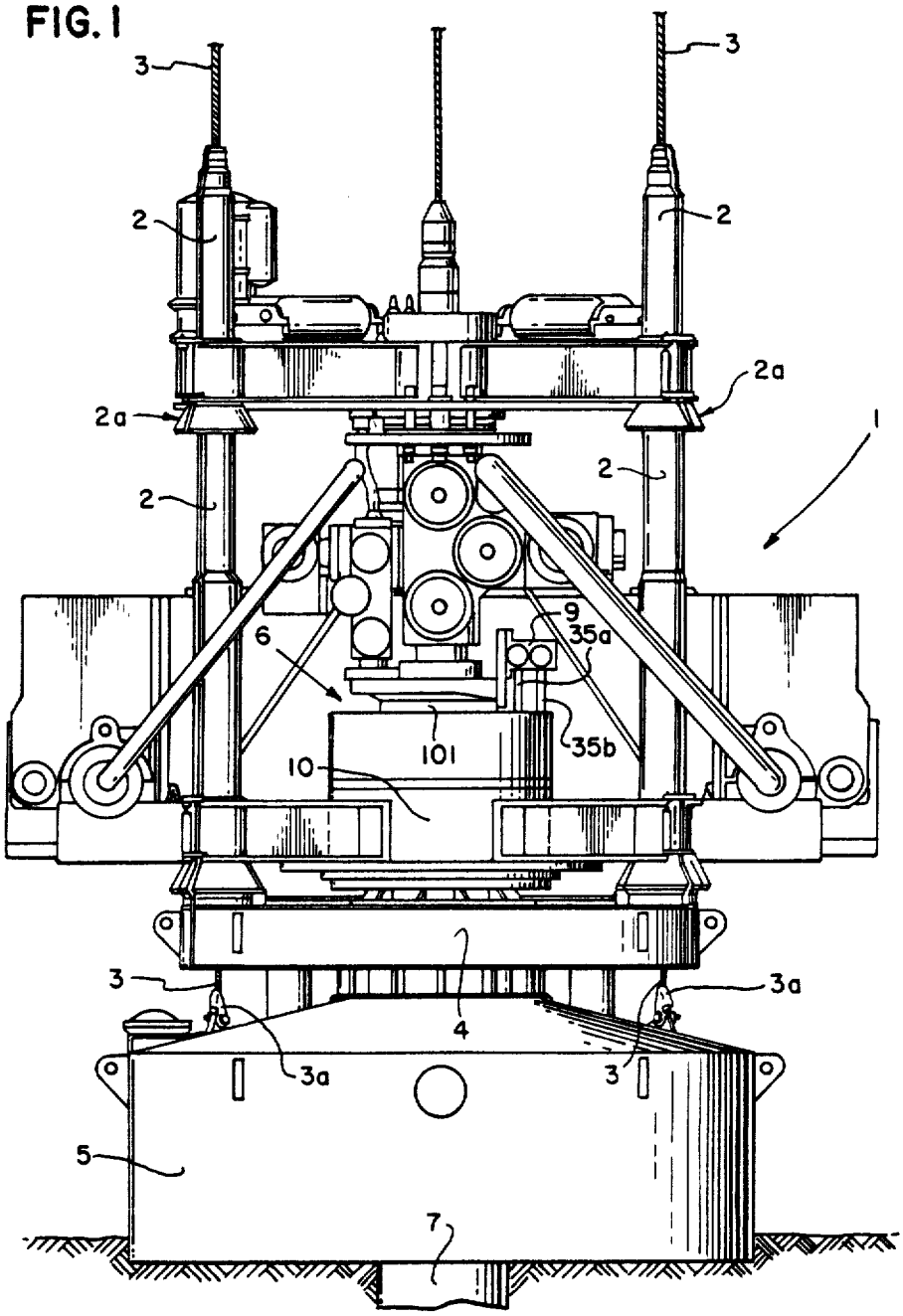
FIG. 1 shows a Christmas tree in place over a drilling template and well casing head.

Referring first to FIG. 1, a sub-sea drilling structure is shown. Drilling christmas tree 1 has been lowered onto drilling template 5 and guided into position by guide cables 3 which are secured to drilling template 5 by connectors 3a. Guide structure 4 at the base of christmas tree 1 generally controls the positioning of the Christmas tree over the drilling template. Guide posts 2 extend upperly from each section of Christmas tree 1 and are used to guide subsequent sections of the christmas tree into position by engaging guide sockets 2a on the lower portion thereof as the subsequent sections of the Christmas tree are lowered into position. A well head connector assembly 6 having a lower body portion 10 latches and locks the christmas tree to an upper portion of well casing head 7 which extends upwardly fastening techniques such as bolts 100 and also is connected to well casing head 7 by well head connector assembly 6.

Figure 2:
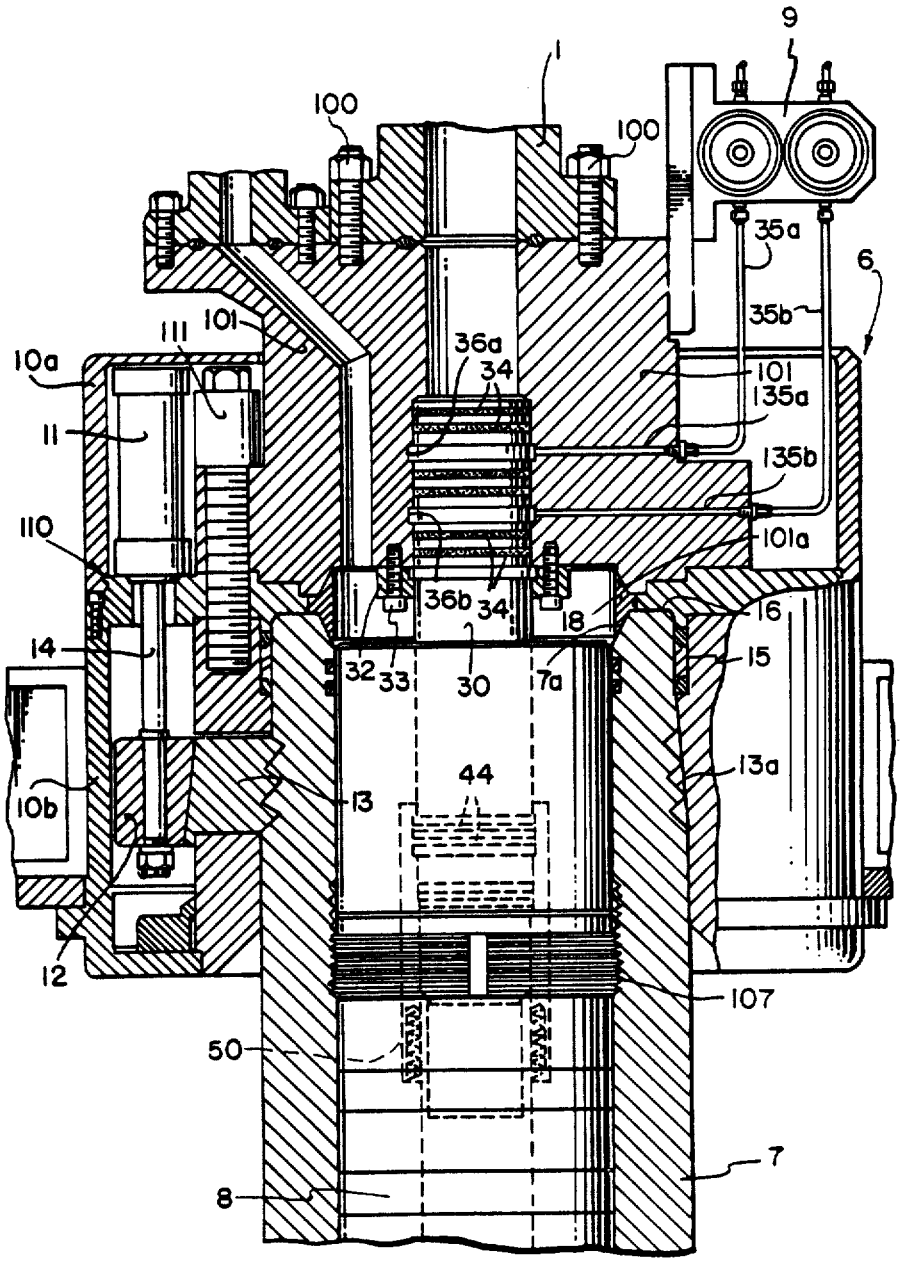
FIG. 2 is a sectional view showing the mandrel means of the present invention secured to the well head connector assembly and the valve means of the present invention in place within a well casing.

Well head connector assembly 6, which is shown in FIG. 2, comprises an upper body portion 10a and a lower body portion 10b which are interconnected by an interlocking joint shown generally at 110 such that upper body portion 10a functions as a protective cover for portions of the well head connector assembly. Lower portion 10b is secured to lower portion 101 of Christmas tree 1 by known fastening means such as bolt assembly 111.

To connect the Christmas tree to the well casing head, the Christmas tree and attached well head connector assembly are lowered over well casing head 7 until landing surface 16 of well casing head 7 contacts abuttment 17 of lower portion 10b. At this point, dog 13 is aligned with locking recesses 13a within an exterior surface of well casing head 7 and may be locked into place as shown in FIG. 2 by actuating a hydraulically operated latch mechanism 11 which acts through push rod 14 to force camming block 12 into a locking position. As camming block 12 rides over dog 13, the dog is forced into locking recess 13a to securely latch and connect the Christmas tree to the well casing head.

To prevent leakage of high pressure fluids between well casing head 7 and Christmas tree 1, a combination of seals is provided. Sealing elements 15 provide a fluid-tight seal between an exterior surface of well casing head 7 and an interior surface of lower portion 10b of the connector assembly. Additionally, a swageable metal seal 18 is secured to lower body portion 10b of the well head connector assembly and, as landing surface 16 and abuttment 17 come in contact, swageable metal seal 18 is firmly seated between sealing surface 7a of well casing head 7 and sealing surface 101a of lower portion 101 of the Christmas tree.

Mandrel means 30 is secured to lower portion 101 of the Christmas tree by the interaction of mounting flange 31 on the mandrel and retainer ring 32. Mandrel 30 is inserted into receiving recesses 30a within lower portion 101 of the Christmas tree. Retainer 32 is slid over the lower portion of mandrel 30 and secured to lower portion 101 by means of mounting bolts 33, thus locking the mandrel into lower portion 101. A fluid-tight seal between lower portion 101 and mandrel 30 is achieved by means of standard sealing elements 34 secured to mandrel means 30.

Figure 3:
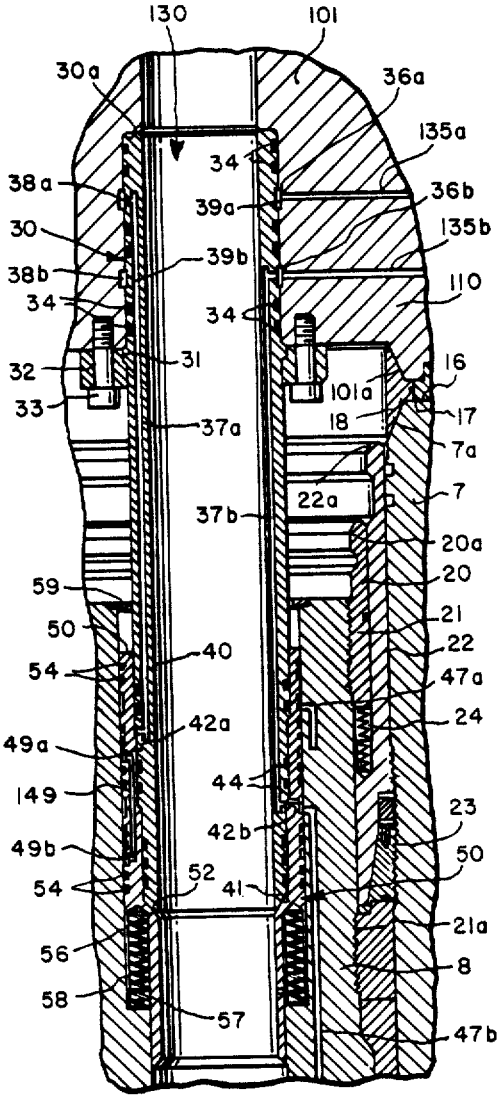
FIGS. 3 and 4 are detailed sectional views showing the valve means being held in a valve-opened position by the mandrel means, as would occur when the well head connector assembly is secured to the well casing.
Figure 5:
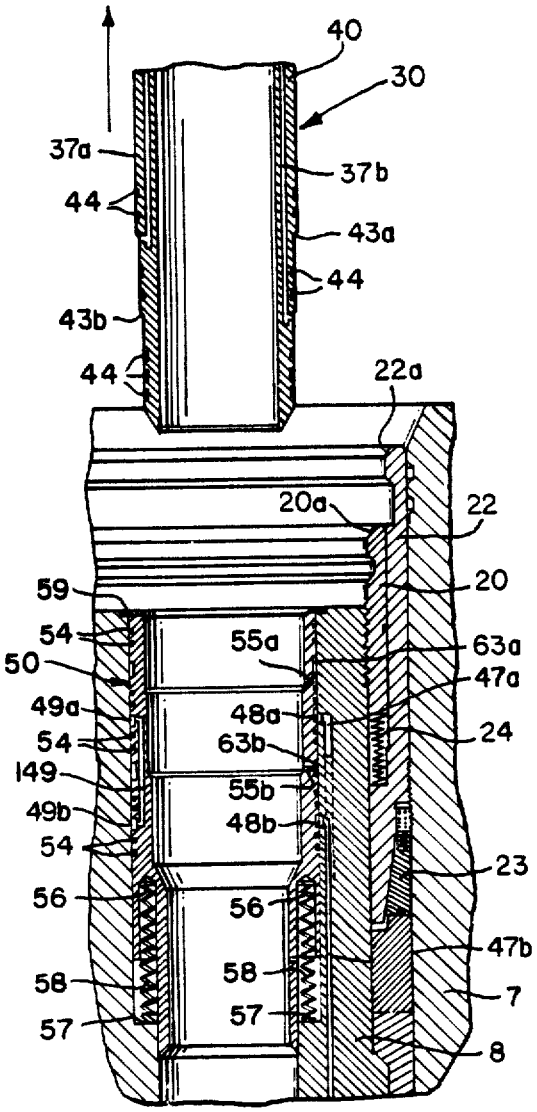
FIG. 5 is a detailed sectional view showing the mandrel means removed from the valve means and the valve means being urged into a valve-closed position by the bias means.

As best seen in FIGS. 2, 3 and 5, valve means 50 is generally coaxially aligned within well casing head 7. More specifically, valve means 50 is positioned within an annular zone 51 formed between an external surface of mandrel means 30 and internal surface of well casing 8. Well casing 8 is, in turn, supported in a generally coaxial alignment within well casing head 7 by threaded means shown generally at 107 such that well casing head 7 also functions as a hanger for well casing 8. Also, as is shown in FIG. 2, sealing means 19 provide a fluid-tight fit between well casing 8 and well casing head 7. Alignment member 20 is secured to well casing 8 by a threaded connection shown generally at 21 and 21a and biases a second alignment member 22 into engagement with a generally ring-like shim block 23 by means of bias spring 24. As best seen in FIG. 3, alignment members 20 and 22 are provided with internal guide surfaces 20a and 22a respectively function generally as a "funnel" to guide a landing tool, not shown, into proper alignment with well casing 8.

Figure 4:
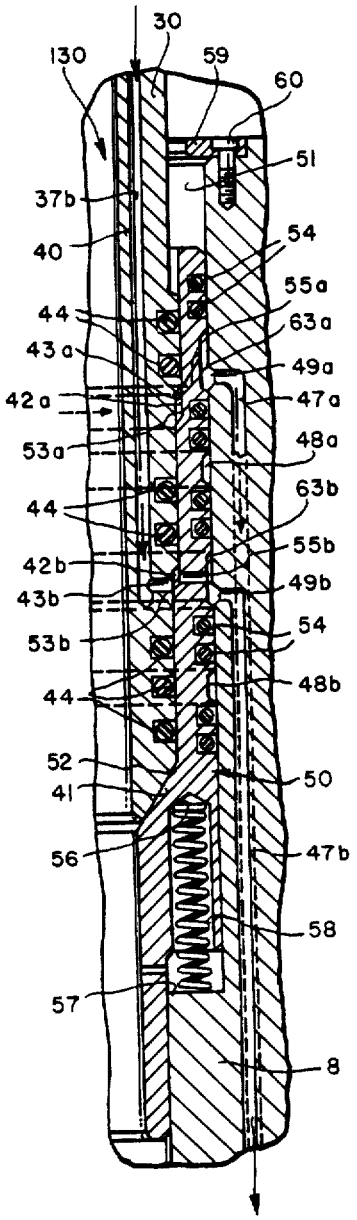
Figure 6:
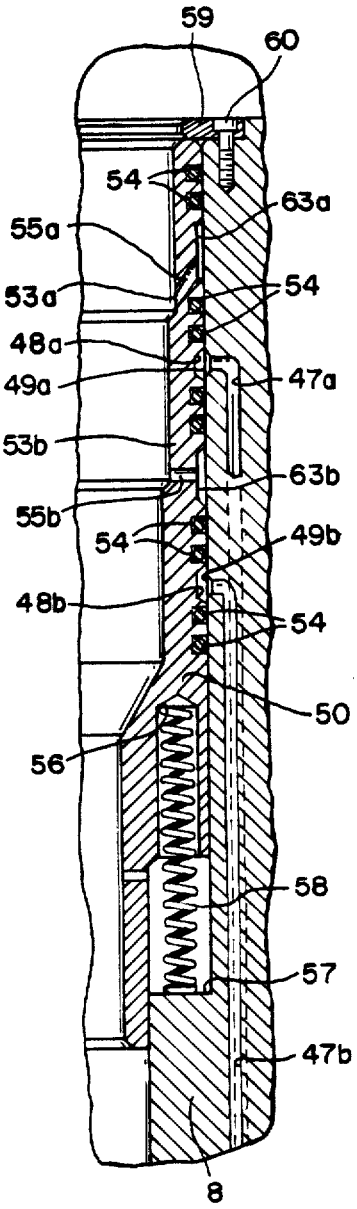
FIG. 6 is a detailed sectional view showing the interaction between the bias means and the valve means, as well as the sealing means between the valve means and well casing.

Valve means 50 is retained within well casing 8 by means of retainer ring 59 which is secured to the well casing by means of set screws 60, as most clearly shown in FIGS. 4 and 6. Valve means 50 thus being generally coaxially aligned within the casing head receives a mandrel means 30 as the Christmas tree is lowered onto the well casing head.

As shown in FIGS. 3 and 5, mandrel means 30 has a generally tubular configuration. The unobstructed central bore 130 of mandrel 30 allows passage of the down hole tools which are not shown. Internal hydraulic line segments 37a and 37b are integrally formed within the wall portions 40 of tubular mandrel 30. These hydraulic line segments conduct hydraulic fluid through the mandrel means. Hydraulic fluid is supplied to internal hydraulic lines segments 37a and 37b from isolation block 9 through lines 35a and 35b respectively to hydraulic channels 135a and 135b respectively within lower portion 101 of the Christmas tree. Annular inlet zones 36a and 36b are provided to obviate any problems of rotational alignment between hydraulic channels 135a /135b and 37a/37b respectively. Annular recess zones 36a and 36b are similar in configuration and, for the sake of brevity, only annular inlet zone 36a will be discussed. Annular inlet 36a is formed by a combination of internal annular recess 38a formed within the surface of recess 30a, which receives mandrel 30, and annular recess 39a formed within an exterior surface of mandrel 30. Recess portions 38a and 39a are aligned with, and opposed each other, when mandrel 30 is secured within recess 30a. Further, and as may be best seen in FIG. 2, annular inlet zones 36a and 36b are isolated by elements of sealing means 34, thus preventing any loss of hydraulic fluid from the zones and a resultant loss in hydraulic pressure within the hydraulic lines.

Internal hydraulic line segments 37a and 37b terminate at annular outlet zones 42a and 42b respectively which are formed by relieving valve means 50 at 53a and 53b, as is best seen in FIG. 4. Thus, an unobstructed fluid flow passage is provided from the isolation valve block 9 to annular inlet zones 36a and 36b to annular outlet zones 42a and 42b through mandrel means 30.

Referring once again to the interaction between mandrel means 30 and valve means 50, abuttment shoulder means 41 on mandrel 30 seat against valve means 50 and urge valve means 50 into a valve-opened position as well head connector assembly 6 is secured to well casing head 7. Abuttment shoulder means 41 is formed integrally of an external surface of the tubular body portion of mandrel means 30.

As has been discussed previously, valve means 50 is generally coaxially lined within well casing head 7 and receives mandrel means 30 as the well head connector assembly 6 is secured to the well casing head 7. Valve means 50 controls fluid flow through associated hydraulic lines 37a and 37b within mandrel means 30 and provide means for interconnecting these hydraulic line segments to hydraulic line segments 47a and 47b respectively within well casing 8.

Valve means 50 has a generally tubular body portion which is longitudinally slideable within annular zone 51 which is formed between mandrel 30 and well casing 8. Valve port means are provided which comprise internal hydraulic line segments 55a and 55b which are formed integrally of wall portions of the tubular body portion of valve 50. Internal hydraulic line segments 55a and 55b of valve means 50 are aligned with annular outlet zones 42a and 42b respectively of mandrel means 30 when mandrel means 30 is fully seated within valve means 50. When thus aligned, internal hydraulic line segments 55a and 55b receive hydraulic fluid from mandrel means 30 and conduct the hydraylic fluid through valve means 50 to outlet recesses 63a and 63b respectively which communicate with hydraulic line segments 47a and 47b respectively within well casing 8.

Mandrel seat means 52 formed integrally of an inner surface of the tubular body portion of valve means 50 are provided for receiving abuttment shoulder means 41 of mandrel means 30.

During normal drilling operations, Christmas tree 1 is secured to well casing head 7 by means of well head connector assembly 6 and abuttment shoulder means 41 of mandrel means 30 is fully seated against mandrel seat 52 of valve means 50. Valve means 50 is urged into a valve-opened position, as shown in FIGS. 3 and 4, and hydraulic lines 35a and 35b from isolation block 9 are connected through mandrel means 30 and valve means 50 to hydraulic line segments 47a and 47b within well casing 8. With valve means 50 in this valve-opened configuration down hole hydraulically operated apparatus such as blow-out prevention equipment may be operated by the hydraulic pressure run through these lines.

Bias means associated with valve means 50 are provided for urging the valve means into a valve-closed position to automatically seal the associated hydraulic lines when mandrel means 30 is withdrawn from the valve means, as is best seen in FIGS. 4 and 6. In the exemplary embodiment shown, a plurality of bias springs 58 are placed circumferentially about posterior portion of valve means 50 and are received by bias spring seat means 56 formed integrally of valve means 50. Abuttment means 57, formed within an internal bore of well casing 8 and generally perpendicular to an axis of the internal bore, position bias springs 58 relative to seat means 56 such that, as bias springs 58 are compressed against abuttment means 57, the springs provide a biasing force for urging seat means 56 and abuttment means 57 generally away from each other. Thus, when mandrel means 30 is fully seated against valve seat 50 and valve means 50 is in the valve-opened position, bias springs 58 are compressed and the biasing force exerted thereby upon valve means 50 is increased.

As mandrel means 30 is withdrawn from valve means 50, as would occur when well head connector assembly 6 and Christmas tree 1 were separated from well casing head 7, and as depicted in FIGS. 5 and 6, bias springs 58 urge spring seat 56 and valve means 50 away from abuttment means 57. This results in a longitudinal displacement of valve means 50 relative to the internal bore of well casing 8 and, as is particularly shown in FIG. 6, inlet ports 48a and 48b of hydraulic line segments 47a and 47b respectively are opposed by exterior wall portions of valve means 50. This results in the sealing of inlet ports 48a and 48b and guarantees retention of hydraulic fluid with lines 47a and 47b, thus preventing leakage of hydraulic fluid therefrom into the sub-sea environment.

It may be seen from a consideration of FIGS. 2, 3, 5, and 6, that although hydraulic line segments 47a and 47b are sealed with respect to the surrounding environment, valve means 50 has been provided with shunt means 149 which interconnects annular recesses 49a and 49b within an exterior surface of valve means 50. As best seen in FIGS. 5 and 6, annular recesses 49a and 49b are aligned with hydraulic line segments 47a and 47b respectively when valve means 50 in the valve closed position. Thus, the hydraulic line segments are allowed to communicate with each other in order that a down hole blow out device may close as mandrel means 30 is withdrawn from valve means 50.

In operation, one embodiment of blow out prevention device, which will now be discussed for illustrative purposes only, is provided with a bifurcated supply of pressurized hydraulic fluid through hydraulic line segments 47a and 47b which are controlled independently. The bifurcated supply of pressurized fluid operates the blow out prevention device between opened and closed positions. As a fail-safe, mechanical means are provided which automatically close the device unless the hydraulic pressure to the "open" side of the device overcomes the mechanical bias means.

The improved valve means 50 of the present invention allows the pressure in hydraulic line segments 47a and 47b to equalize through shunt means 149 and the mechanical bias means of the down hole blow out device automatically closes the device.

Thus, the valve means of the present invention operate seal off hydraulic line segments 47a and 47b from the sub-sea environment while, at the same time, allowing pressure to equalize between the line segments to allow the down hole blow out prevention device to close. This combined leakage and blow out prevention protects the environment from accidental pollution during drilling operations which are being carried out under extremely difficult conditions and which are highly vulnerable to the forces of nature.

To provide a fluid-tight seal between mandrel means 30 and valve means 50 as well as between valve means 50 and well casing 8, seal means shown generally at 44 and 54 are provided.

Referring specifically to the sealing means between mandrel means 30 and valve means 50, reference is made to FIGS. 3 and 4 wherein resilient compressible sealing members 44 are secured circumferentially about mandrel means 30 and longitudinally located thereon to isolate annular outlet zones 42a and 42b from each other and prevent hydraulic fluid leakage between mandrel means 30 and valve means 50.

Sealing members 54, which are similar to sealing members 44, provide a fluid-tight seal between valve means 50 and well casing 8 and are secured within circumferential recesses in external well of valve means 50. Sealing members 54 are longitudinally position with respect to valve means 50 such that they provide a fluid-tight seal on each side of inlet ports 48a and 48b to hydraulic line segments 47a and 47b when valve means 50 is in a valve-opened position, as is shown in FIG. 4, or in a valve-closed position, as is shown in FIG. 6.

Having thus described an exemplary embodiment of an improved safety apparatus and method for automatically sealing hydraulic lines within a sub-sea well casing when the casing is disconnected from an associated well head connector and Christmas tree assembly, it should be understood by those skilled in the art that various alternatives and modifications thereof may be made within the scope and spirit of the present invention which is defined by the following claims.

I claim:

1. An improved safety apparatus for automatically sealing hydraulic lines within a sub-sea well casing when said casing is disconnected from an associated well head connector, comprising the provision of:

mandrel means associated with a well head connector assembly;

valve means generally coaxially aligned within said casing head for receiving said mandrel means and for controlling fluid flow through associated hydraulic lines, said valve means being urged into a valve-opened position by said mandrel means as said well head connector assembly is secured to said well casing head; and bias means associated with said valve means for urging said valve means into a valve-closed position to seal said hydraulic lines when said mandrel means is withdrawn from said valve means.

2. The apparatus of claim 1 comprising the provision of:

hydraulic fluid passages in said mandrel means and through said valve means which are in fluid communication with each other when said mandrel is received by said valve means.

3. The apparatus of claim 1, comprising the provision of:

seal means associated with said valve means for providing a fluid-tight seal between said mandrel means and said valve means and between said valve means and said well casing.

4. The apparatus of claim 1 wherein said mandrel means comprises the provision of:

a body portion having a generally tubular configuration;

internal hydraulic line segments for conducting hydraulic fluid through said mandrel means; and abutment shoulder means for seating against said valve means and urging said valve means into a valve opened position as said well head connector assembly is secured to said casing head.

5. The apparatus of claim 4 wherein said internal hydraulic line segments are integrally formed within the wall portions of said tubular mandrel.

6. The apparatus of claim 4 wherein said abuttment shoulder means is formed integrally of an external surface of said tubular body portion of said mandrel means.

7. The apparatus of claim 4 wherein said valve means comprises the provision of:

a generally tubular body portion longitudinally slideable within an annular zone between said mandrel means and said casing head;

valve port means aligned with outlet portions of said internal hydraulic line segments of said mandrel means when said mandrel means is fully seated within said valve means for receiving hydraulic fluid from said mandrel means and conducting said hydraulic fluid through said valve means.

8. The apparatus of claim 7 wherein said mandrel seat means is formed integrally of an inner surface of said tubular valve body portion of said valve means.

9. The valve means of claim 7, wherein said valve port means comprises the provision of:

internal hydraulic line segments formed integral of wall portions of said tubular valve body portion.

10. The valve means of claim 7 comprising the provision of:

annular recess means within an exterior surface of said valve means aligned with said hydraulic lines within said sub-sea well casing when said mandrel means has been removed from within said valve means and when said valve means has been urged into a valve closed position by associated bias means; and internal shunt means formed integral of wall portions of said tubular valve body portion for operationally interconnecting said annular recess means whereby, as said mandrel means is removed from within said valve means and as said valve means is urged into a valve closed position by said associated bias means, said external annular recess means and said shunt means operationally interconnect said associated hydraulic lines allowing pressure equalization therebetween.

11. The apparatus of claim 1, whereby said bias means comprises the provision of:

seat means integral of said valve means for receiving bias spring means;

abuttment means within an internal bore of said well casing and generally perpendicular to an axis of said seat means; and bias spring means interposed between said seat means and said abuttment means for providing a biasing force for urging said seat means and said abuttment means generally away from each other.

12. A method for automatically sealing hydraulic fluid lines within a sub-sea well casing when said casing is disconnected from an associated well head connector comprising the steps of:

mounting a mandrel means on a well head connector assembly;

locating a valve means *coaxially aligned* in said well casing head for movement between valve open and valve closed positions relative to hydraulic fluid lines in the well casing head;

moving said valve means into a valve-opened position by engagement of said mandrel means and said valve means as said well head connector assembly is secured to said well casing head; and allowing said valve means to move under its own bias into a valve-closed position as said mandrel means and said valve means are disengaged on removal of said connector from said casing.

13. An improved safety apparatus for controlling fluid flow through hydraulic lines within a sub-sea well casing in response to landing and removing and associated well head connector, comprising the provision of:

mandrel means mounted to a well head connector assembly to enter the well casing head on landing of the connector [or] *on* the casing head; and valve means movably mounted *to and coaxially aligned* within said casing head in the path of said mandrel controlling fluid flow through associated hydraulic lines by said mandrel means operating said valve means on landing and removing said *well head* connector relative to said casing head.

14. The apparatus of claim 13 comprising:

bias means associated with said valve means for urging said valve means into a valve-closed position to seal said hydraulic lines when said mandrel means is withdrawn from said valve means.

15. The apparatus of claim 14, comprising the provision of:

hydraulic fluid passages in said mandrel means and said valve means which are in fluid communication with each other when said mandrel is operating said valve means to a valve opened position; and seal means associated with said valve means for providing a fluid-tight seal between said mandrel means and said valve means and between said valve means and said well casing relative to said hydraulic fluid passages and lines.

*16. The apparatus of claim 13 comprising:*

*said mandrel means coaxially aligned with said valve means wherein said landing and removing of said well head connector mounting said mandrel means urges said valve means into a valve-open and valve-closed position.*

* * * * *